US012292039B1

(12) United States Patent
Vancil

(10) Patent No.: US 12,292,039 B1
(45) Date of Patent: May 6, 2025

(54) ION PROPULSION PLASMA CATHODE ASSEMBLY

(71) Applicant: Bernard K Vancil, Beaverton, OR (US)

(72) Inventor: Bernard K Vancil, Beaverton, OR (US)

( * ) Notice: Subject to any disclaimer, the term of this patent is extended or adjusted under 35 U.S.C. 154(b) by 0 days.

(21) Appl. No.: 18/674,317

(22) Filed: May 24, 2024

Related U.S. Application Data

(60) Provisional application No. 63/531,252, filed on Aug. 7, 2023, provisional application No. 63/468,718, filed on May 24, 2023.

(51) Int. Cl.
*F03H 1/00* (2006.01)
*B64G 1/40* (2006.01)

(52) U.S. Cl.
CPC .......... *F03H 1/0006* (2013.01); *B64G 1/413* (2023.08)

(58) Field of Classification Search
CPC ........................................ F03H 1/006
See application file for complete search history.

(56) References Cited

U.S. PATENT DOCUMENTS

2018/0269024 A1\* 9/2018 Nguyen ............ H01J 37/32596
2020/0240398 A1\* 7/2020 Vancil ..................... H01J 37/32

OTHER PUBLICATIONS

Dan M. Goebel and Ira Katz, "Propulsion: Ion and Hall Thrusters," Jet Propulsion Laboratory California Institute of Technology, JPL Space Science and Technology Series, Mar. 2008 (Year: 2008).\*
Alexander J.N. Daykin-Iliopoulos and Franco Bosi, "Characterisation of a 30 A Heaterless Hollow Cathode," IEPC-2019-802, 36th International Electric Propulsion Conference, Sep. 15-20, 2019. (Year: 2019).\*

\* cited by examiner

*Primary Examiner* — David P. Olynick
(74) *Attorney, Agent, or Firm* — patenttm.us

(57) ABSTRACT

Plasma cathodes for Hall and ion thrusters of high power efficiency, high current, low cost, compactness, are provided. The cathodes employ an orifice cup for containing plasma or discharge outside of the cathode insert.

14 Claims, 3 Drawing Sheets

ION PROPULSION PLASMA CATHODE ASSEMBLY

CROSS-REFERENCE TO RELATED APPLICATIONS

This application claims benefit of U.S. provisional patent application Ser. No. 63/468,718 filed May 24, 2023, and U.S. provisional patent application Ser. No. 63/531,252 filed Aug. 7, 2023, which are both incorporated herein by reference.

BACKGROUND

This disclosure relates to ion and Hall thrusters for electric space propulsion use and more particularly to improved cathodes and geometry for in-space ion propulsion use.

There is a great need in satellites, and space probes, for efficient low-cost, low-power-consumption thrusters for use for acceleration, attitude control, north/south positioning, orbit raising/lowering and formation flying.

Current art has the hollow cathode with an orifice plate over the end of the cathode insert (See FIG. 1). A helical heater is provided. However, this configuration is sub-optimal because the plasma is confined inside the hollow emitter. For the kind of currents desired, that is not enough plasma volume to efficiently carry the electrons from emitter out through the orifice to the anode which would be positioned beyond the orifice cup.

SUMMARY

In accordance with the disclosure, a plasma cathode for Hall and ion thrusters of high power efficiency, low cost, compactness, and durability is provided, employing an orifice cup to keep the plasma or discharge outside of the cathode insert yet confined inside the orifice cup.

The subject matter of the present technology is particularly pointed out and distinctly claimed in the concluding portion of this specification. However, both the organization and method of operation, together with further advantages and embodiments thereof, may best be understood by reference to the following description taken in connection with accompanying drawings wherein like reference characters refer to like elements.

DETAILED DESCRIPTION

The system according to a preferred embodiment of the present disclosure comprises plasma cathodes for Hall and ion thrusters. The cathodes employ small planar or hollow cathodes as electron source.

Figure 1:
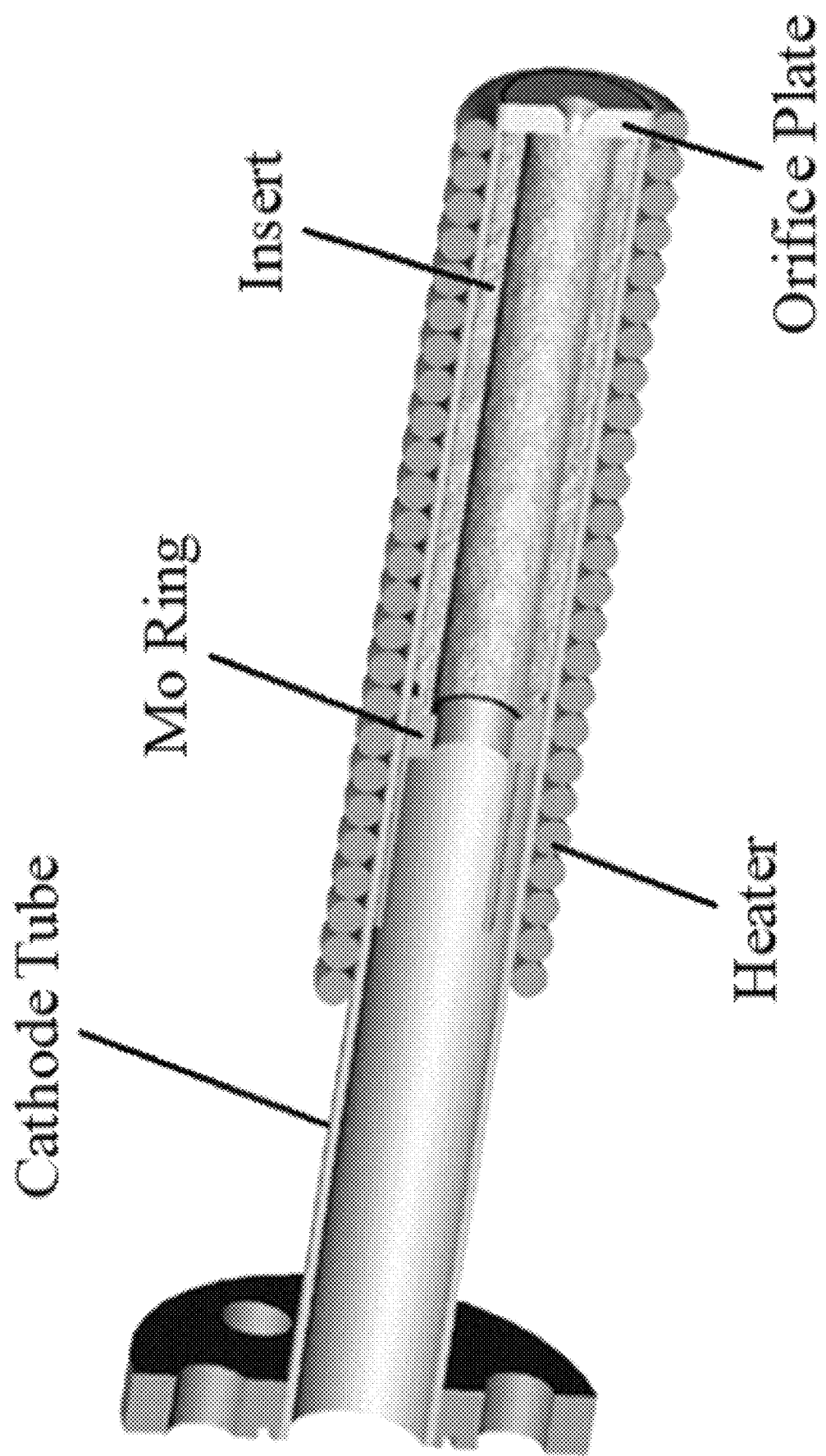
FIG. 1 is a sectional diagram of a thruster hollow cathode assembly in accordance with the prior art.
Figure 2:
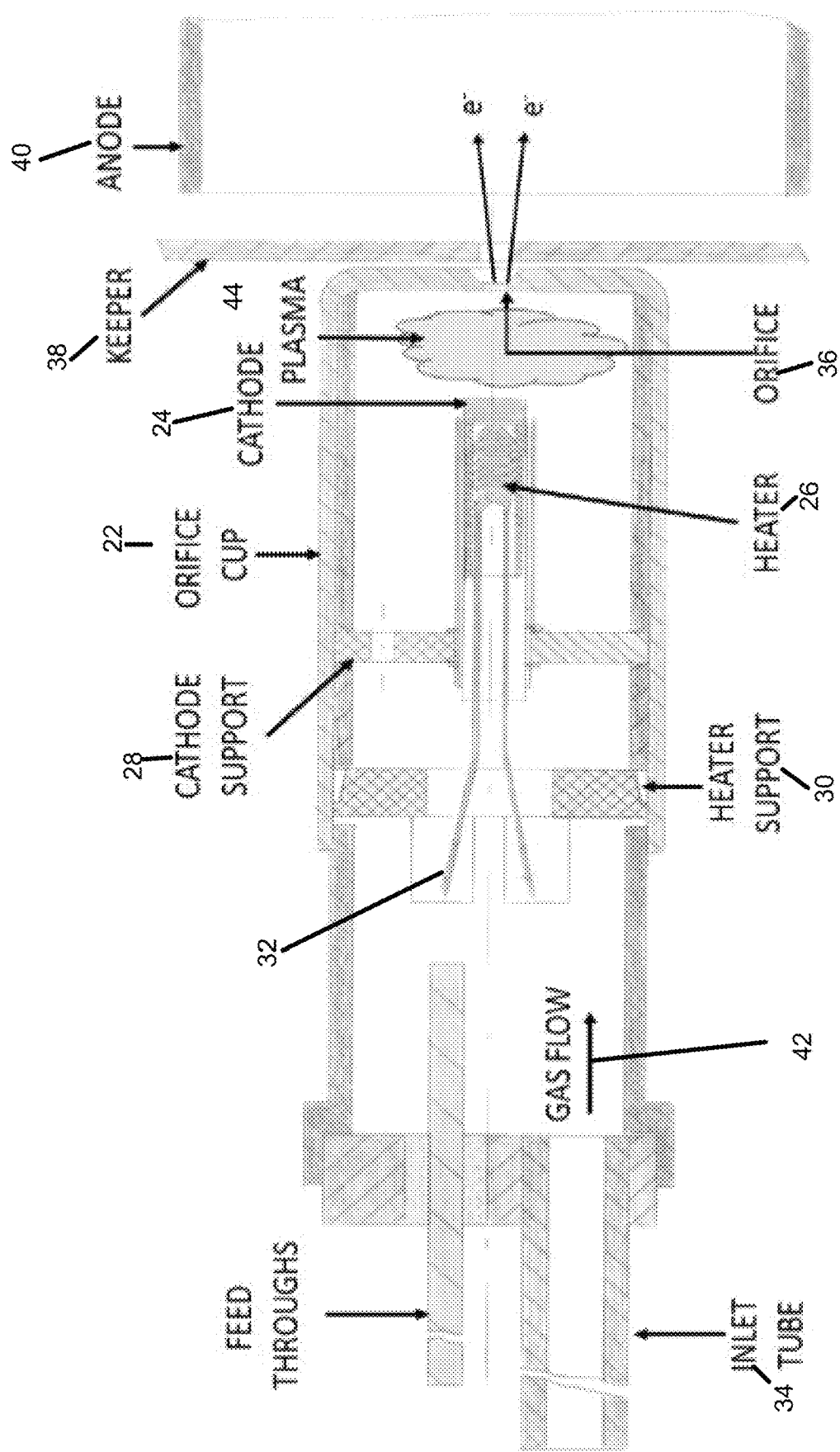
FIG. 2 is a sectional diagram of a micro-thruster cathode assembly employing a planar insert and orifice cup to confine the discharge plasma.

Referring now to FIG. 2, a sectional diagram of a micro-thruster cathode assembly 20 employing a planar insert, mounted in the hollow interior of an orifice cup 22 is a planar thermionic emitter cathode 24 which is heated by helical heater 26. The emitter is supported by cathode support 28, while the heater is supported by heater support 30. Heater leads 32 supply power to operate the heater. An inlet tube 34 provides gas flow into the body of the assembly. An orifice 36 is formed at the end of the orifice cup and an anode 40 is positioned outside the orifice cup, with optional keeper plate 38 therebetween.

In operation, a propellant gas flow 42 is provided via the inlet tube 34, such as xenon or other inert gas, and electrons from the emitter combined with the gas form plasma 44, contained within the orifice cup in front of the cathode. The anode causes the electrons to flow out of the orifice 36, which then ionize a larger body of gas beyond the orifice.

Figure 3:
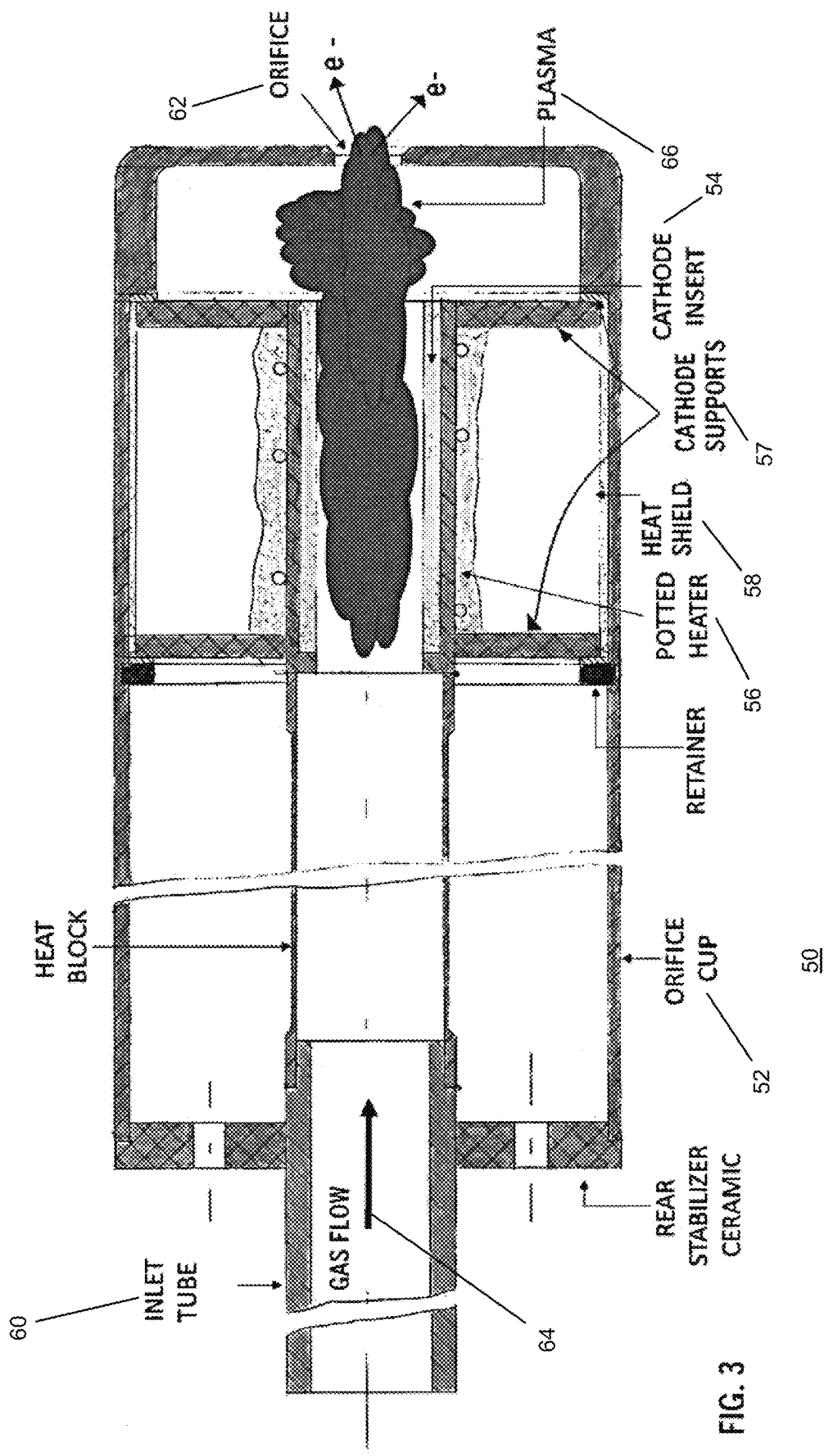
FIG. 3 is a sectional diagram of a large (up to 50 kilowatts) thruster cathode assembly employing a hollow insert.

An alternative to the configuration of FIG. 2 is provided, employing a hollow emitter, as illustrated in FIG. 3. a sectional diagram of a thruster cathode assembly 50 employing a hollow cathode insert. In this configuration, the hollow interior of an orifice cup 52 a hollow thermionic emitter cathode 54 which is heated by potted heater 56. The heater elements may be observed to be helical in FIG. 3 and the orifice cup is electrically isolated from the emitter. The emitter is supported by emitter supports 57/heat shield 58. An inlet tube 60 provides gas flow into the body of the assembly. An orifice 62 is formed at the end of the orifice cup and an anode (not shown in FIG. 3) is positioned outside the orifice cup.

In operation, a propellant gas flow 64 is provided via the inlet tube 60 with the heater powered to heat the cathode, and electrons from the emitter combined with the gas to form plasma 66. The orifice cup contains the plasma in front of the cathode. The anode causes the electrons to flow out of the orifice 62, which then ionize a larger body of gas beyond the orifice.

In accordance with the disclosure above, the plasma or discharge is kept in front of the cathode yet confined inside the orifice cup. With this configuration, and particularly with a hollow cathode in this geometry, improved performance with much higher currents, and much lower size and power can be obtained as compared with the current art.

In accordance with the disclosure, electric propulsion in satellites and space probes, with attitude control, positioning, orbit raising/lowering, acceleration and formation flying can be provided. The hollow cathode configuration is most applicable where power and thrust requirements are high. Large satellites in geosynchronous orbits could use this device for raising/lowering the orbit, attitude control and station keeping. Large space probes for interplanetary missions could use this invention for acceleration to high velocities and for long voyages.

While a preferred embodiment of the technology has been shown and described, it will be apparent to those skilled in the art that many changes and modifications may be made without departing from the broader aspects. The appended claims are therefore intended to cover all such changes and modifications as fall within the true spirit and scope of the technology.

What is claimed is:

1. A plasma cathode for in space ion propulsion, comprising:
   a gas flow;
   a hollow emitter through which the gas flow passes;
   an orifice cup, surrounding the hollow emitter and having a portion extending downstream of the hollow emitter, for containing plasma produced by the interaction of electrons from the emitter with said gas flow, said orifice cup having a discharge orifice in the portion downstream of the hollow emitter, said orifice cup containing said plasma in a substantial space between said emitter and said discharge orifice with said orifice cup electrically isolated from said emitter; and a keeper electrode disposed downstream of said discharge orifice.

2. The plasma cathode according to claim 1, wherein said emitter comprises a hollow impregnated emitter.

3. The plasma cathode according to claim 1, comprising a hollow reservoir emitter.

4. The plasma cathode according to claim 1, having a hollow reservoir and a hollow impregnated emitter.

5. The plasma cathode according to claim 1, in which the keeper electrode is for starting a discharge and protecting the orifice cup from energetic back streaming ions.

6. The plasma cathode according to claim 1, in which a potted helical heater is disposed inside an orifice cup and disposed in close proximity around said emitter.

7. The plasma cathode according to claim 1, wherein said hollow emitter has a discharge opening that is free from diameter restriction at a discharge position of the gas flow through said emitter.

8. A plasma cathode for in space ion propulsion, comprising:
a hollow emitter through which a gas flow passes;
an orifice cup, surrounding the hollow emitter and having a portion extending downstream of the hollow emitter, for containing a plasma produced by the interaction of electrons from the emitter with the gas flow, said orifice cup having a discharge orifice in the portion downstream of the hollow emitter, a discharge position of said emitter discharging electrons into an enclosed space defined between said emitter and said discharge orifice; and a keeper electrode disposed downstream of said discharge orifice.

9. The plasma cathode according to claim 8, wherein said hollow emitter comprises a hollow impregnated emitter.

10. The plasma cathode according to claim 8, comprising a hollow reservoir emitter.

11. The plasma cathode according to claim 8, having a hollow reservoir and a hollow and impregnated emitter.

12. The plasma cathode according to claim 8, in which a keeper electrode is inserted down stream from the orifice cup for starting a discharge and protecting the orifice cup from energetic back streaming ions.

13. The plasma cathode according to claim 8, in which a potted helical heater is disposed inside the orifice cup and disposed in close proximity around said emitter.

14. The plasma cathode according to claim 8, wherein said hollow emitter has a discharge opening that is free from diameter restriction at a discharge position of the gas flow through said cathode.

* * * * *